United States Patent [19]

Talbott

[11] 4,106,786

[45] Aug. 15, 1978

[54] RECREATIONAL VEHICLE FOR USE ON SLOPING TERRAINS

[76] Inventor: Earl Raymond Talbott, 409 Jeff St., Newell, W. Va. 26050

[21] Appl. No.: 793,835

[22] Filed: May 5, 1977

[51] Int. Cl.² ............................................. B62B 13/18
[52] U.S. Cl. ........................................ 280/8; 280/205; 280/87.04 A
[58] Field of Search ................. 280/87.04 R, 87.04 A, 280/11.1 R, 11.1 BT, 8, 205, 87.03

[56] References Cited

U.S. PATENT DOCUMENTS

| 3,399,904 | 9/1968 | Schinke ............................ 280/87.03 |
| 3,438,642 | 4/1969 | Kite et al. ................................ 280/8 |

Primary Examiner—John A. Pekar
Attorney, Agent, or Firm—W. D. Palmer

[57] ABSTRACT

Recreational vehicle comprises a riding platform having provided therein a centrally disposed aperture, with a single wheel mounted in the aperture. A first pair of skid means is spaced on either side of the plane of the wheel and projects forwardly of the wheel. A second pair of skid means is spaced on either side of the plane of the wheel and projects rearwardly of the wheel. A manual support means is affixed to the platform to provide for support of a standing rider. When riding the vehicle, speed can be controlled by the rider shifting weight, with a backward shift causing the rearward skids to contact the terrain and provide a braking action.

9 Claims, 6 Drawing Figures

RECREATIONAL VEHICLE FOR USE ON SLOPING TERRAINS

BACKGROUND OF THE INVENTION

This invention relates to recreational riding vehicles and, more particularly, to a recreational vehicle which can be ridden in a standing position down a sloping terrain.

Single wheeled recreational vehicles adapted to be ridden in a standing position are known, such as described in U.S. Pat No. 1,585,258, dated May 18, 1926 to Moore. This particular vehicle is moved by actuating the support pole portion thereof.

In U.S. Pat. No. 3,512,798, dated May 19, 1970 to Siegel is disclosed a vehicle having a single center wheel mounted in an aperture in a platform, with both longitudinal and lateral support provided by small wheels shaped as spherical members.

A vehicle having a large single wheel mounted on a riding platform coupled with a supporting handle is shown in U.S. Pat. No. 2,825,575, dated Mar. 4, 1958 to Mickels.

Other various forms of skate boards are known which use center wheel supports with supplemental lateral and longitudinal wheels for additional support, such as disclosed in U.S. Pat. No. 3,399,904, dated Sept. 3, 1968 to Schinke.

SUMMARY OF THE INVENTION

There is provided a recreational vehicle adapted to be ridden down a sloping surface or terrain. The vehicle comprises a riding platform having an aperture provided therein which is disposed in the direction of movement intended for the vehicle. A wheel is mounted in the aperture with the axle portion thereof affixed to the platform and perpendicular to the direction of movement intended for the vehicle. An appreciable portion of the wheel projects above the platform and an appreciable portion of the wheel projects beneath the platform. A pair of spaced elongated skid members are affixed to the platform and project beneath the same and are positioned on either side of a vertical plane through the wheel and extend forwardly of the wheel. A second pair of skid members are affixed to the platform and project beneath same and are positioned on either side of a vertical plane through the wheel and extend rearwardly thereof. The wheel projects further beneath the platform than the skid members and the latter prevent the platform from contact with the terrain to be traversed, and also provide a braking action. A support means affixed to the platform provides the rider with a manual support to enable the vehicle to be ridden in a standing position, with the speed of the vehicle controlled by the rider shifting weight. When the rider shifts weight backwardly, the rearward skids contact the terrain to provide a braking action, and when the vehicle is parallel to the terrain being traversed, the speed thereof is limited only by the slope and resulting frictional forces, coupled with the ability of the rider. The combined skids also provide lateral support as well as forward support to prevent the periphery of the riding platform from contacting the terrain.

BRIEF DESCRIPTION OF THE DRAWINGS

For a better understanding of the invention, reference should be had to the accompanying drawings wherein.

DESCRIPTION OF THE PREFERRED EMBODIMENT

Figure 1:
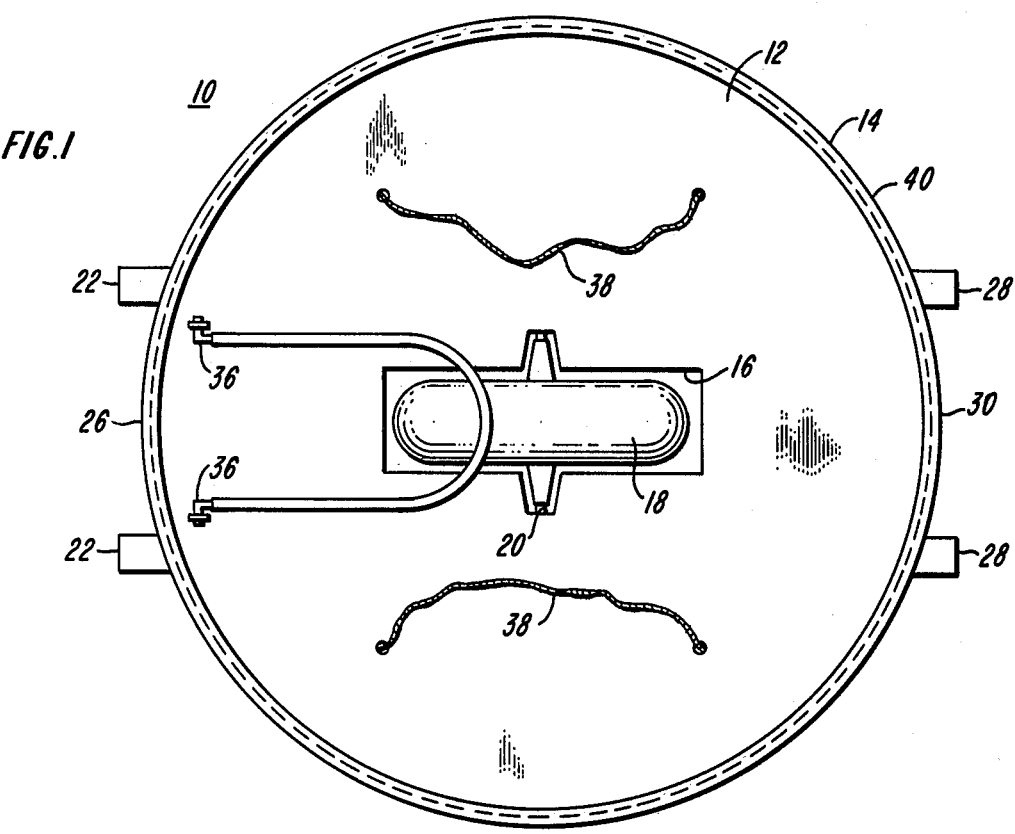
FIG. 1 is a top view of the vehicle showing the riding platform, center wheel, portions of the skids and the support handle.

With specific reference to the form of the Invention illustrated in the drawings, the vehicle 10 as shown in FIG. 1 generally comprises a riding platform 12 having a peripheral portion 14, which preferably is rounded, and having provided therein an aperture 16 which is elongated and disposed in the direction of movement intended for the vehicle 10.

Mounted in the aperture 16 is a wheel or wheel means 18 having an axle portion 20, with the axle 20 affixed to the platform 12 and disposed perpendicular to the direction of movement intended for the vehicle. As explained in greater detail hereinafter, the radius of the wheel 18 is sufficient that an appreciable portion of the wheel 18 projects beneath the platform 12 and an appreciable portion thereof projects above the platform 12. Preferably, the single wheel 18 is centrally disposed with respect to the platform 12 and the configuration of the aperture 16 and wheel 18 generally conform, with about one-half inch (1.27 cm.) clearance therebetween.

Figure 2:
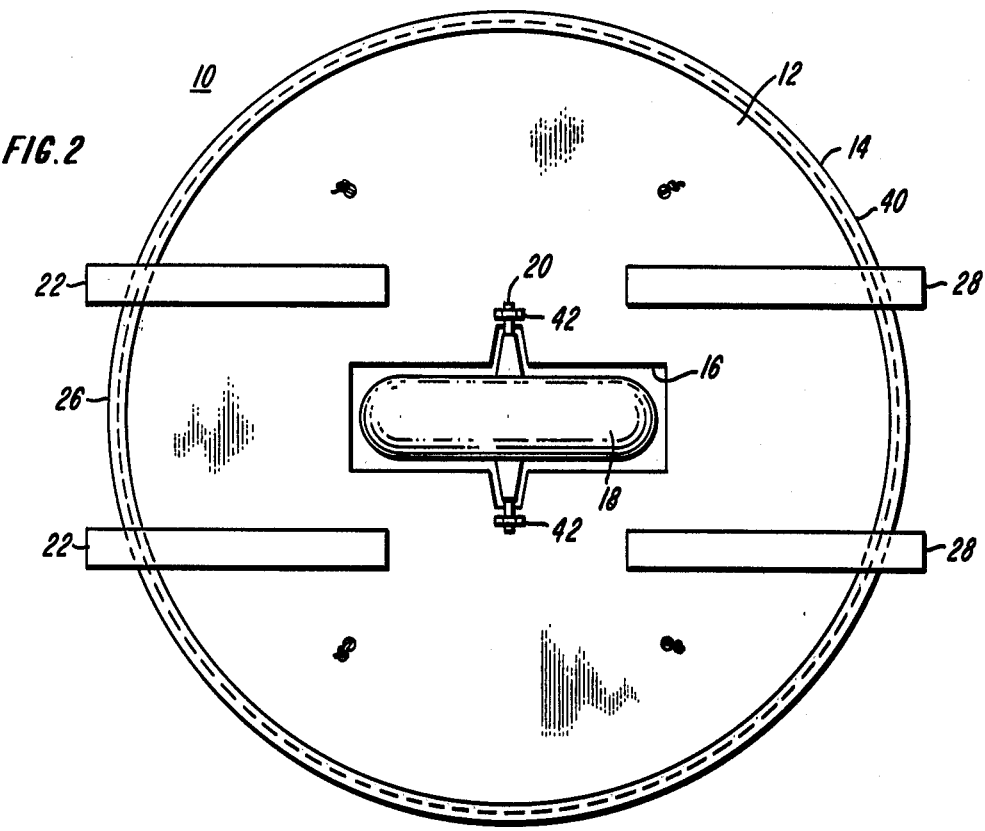
FIG. 2 is a bottom view of the vehicle showing the skids in greater detail.

Referring to both FIGS. 1 and 2, elongated spaced forward skid means 22 are affixed to and project beneath the platform 12 with the length dimensions thereof disposed in the direction of movement intended for the vehicle. These skid means 22 are positioned laterally on opposite sides of a vertical plane through the wheel 18 and perpendicular to the wheel axle portion 20. As shown more clearly in FIG. 3, the leading edge portions 24 of the forward skid means, which could abut and snag the terrain to be traversed, have a gradually upwardly sloping configuration, preferably curved, to provide a smooth skidding contact with the terrain to be traversed, and the forward skid means 22 extend a sufficient distance forwardly to prevent the leading edge portion 26 of platform 12 from ever contacting the terrain.

Figure 3:
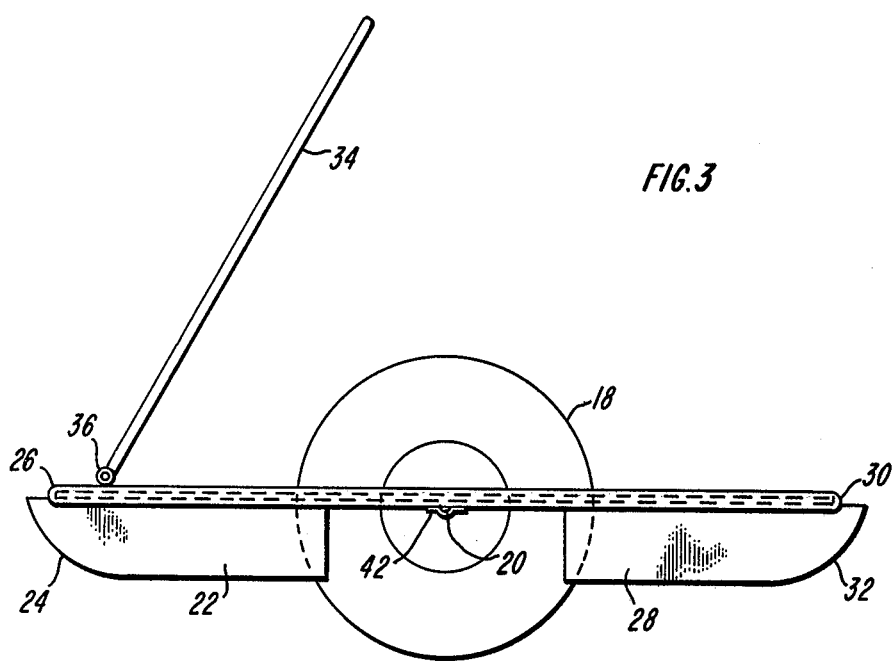
FIG. 3 is a side elevation of the vehicle.

Referring to FIGS. 2 and 3, elongated spaced rearward skid means 28 are affixed to and project beneath the platform 12 with the length dimensions thereof disposed in the direction of movement intended for the vehicle. These rearward skids 28 extend a sufficient distance rearward to prevent the trailing edge portion 30 of platform 12 from contacting the terrain to be traversed. Preferably the trailing edge portions 32 of the rearward skids 28 have a gradually upwardly sloping configuration, preferably curved, to provide a smooth skidding contact with the terrain. The individual forward skids 22 and rearward skids 28 preferably are aligned.

As shown in FIG. 3, the distance the wheel 18 projects beneath the platform 12 is greater than the distance the forward skids 22 and rearward skids 28 project beneath the platform 12, and when the vehicle 10 is in a vertical position on horizontal terrain, all of the skids 22, 28 are spaced from the terrain. The lateral spacing of the skids 22 and 28 is such that when the vehicle 10 is appreciably tilted with respect to the terrain on which it is supported, at least one of the skid members 22 and 28 contact the terrain before any peripheral portion 14 of the platform 12 contacts the terrain. As explained hereinafter, when the vehicle 10 is tipped backward, the curved portions 32 of skids 28 contact the terrain to provide a braking action.

A manual support means for the rider can take the form of a movable handle 34, affixed proximate the leading edge portions of the platform 12 by suitable hinges 36. This enables the rider to stand on the vehicle in a crouched position to control same. The handle 34 also rotates to a forward position to enable the vehicle to be pulled, such as up the sloping terrain. Other forms of manual support means can be provided, an example being a pair of looped rope supports 38 affixed to the platform 12, which can be used instead of the handle to provide the rider with adequate support.

The platform 12 is provided with a bumper guard 40 about the periphery thereof which can take the form of a rubberized or resilient member overfitting the peripheral edges 14 of the platform 12 and screwed or otherwise affixed thereto. As a specific example, platform 12 can be formed of plastic or wood, such as one-half inch (1.27 cm) plywood, having a circular configuration and a diameter of about four feet (122 cm). The wheel is preferably of the type which uses a pneumatic tire with the diameter of the wheel and tire being about sixteen inches (40.6 cm). The conventional axle portion 20 of the wheel 18 is affixed to the bottom of the platform 12 by suitable strap means 42, see FIG. 2. When not in use, the handle 34 can lie flat on the platform 12. The skids 22 and 28 are preferably formed from hard wood, such as oak and preferably are affixed to the platform 12 by suitable screws. Suitable lateral dimensions for the skids are two by four inches (5.08 cm × 10.16 cm). With the skids laterally spaced from the wheel by nine inches (22.86 cm), the performance of the vehicle is very satisfactory.

Figure 4:
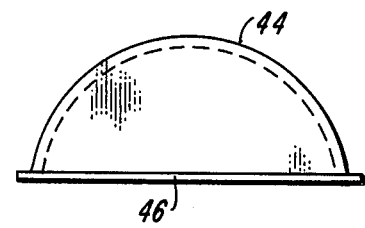
FIG. 4 is an elevational view of a wheel cover which may be used.
Figure 5:
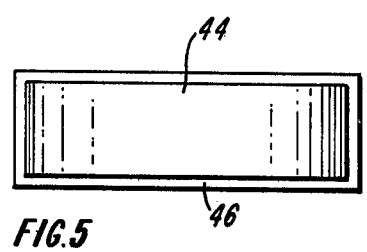
FIG. 5 is a plan view of the wheel cover shown in FIG. 4.

In FIGS. 4 and 5 is shown a cover 44 which may be provided for the portion of the wheel 18 which projects above the platform 12. The cover is preferably metal or plastic and conformed to provide a suitable clearance for the wheel 18 and the cover has a projecting lip portion 46 which may be screwed or otherwise affixed to the platform 12.

Figure 6:
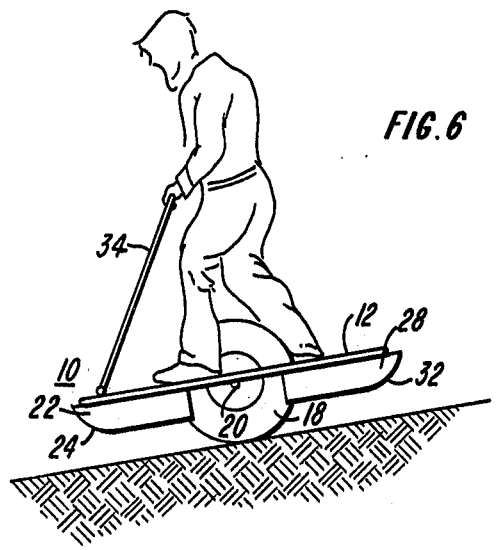
FIG. 6 is a view of the vehicle as being ridden down a sloping terrain, with the preferred position of the rider shown.

The vehicle as ridden down a sloping terrain is shown in FIG. 6. The rider grasps the handle 34 and maintains the knees slightly bent, preferably with one foot toward the front of the vehicle and one foot toward the rear. By means of the rider shifting his weight forward and backward, the speed of the vehicle can be controlled, with maximum speed being obtained when the vehicle 10 is parallel to the terrain being tranversed. When braking is desired, the weight of the rider is shifted backward to cause the rearward skids 28 to contact the terrain in a braking, skidding fashion. The more the weight of the rider is shifted toward the rear, the greater the braking action due to increased weight being placed on the curved portions 32 of the rearward skids 28. Some control in the steering can be obtained by shifting the weight from side to side. With a 4 foot (122 cm) platform, the vehicle is reasonably stable and the speed thereof can be easily controlled by the variable and readily controlled braking action. The single pneumatic wheel 18, which can be of the type used on wheel-barrows, enables the vehicle to be used on either very smooth terrains, such as a paved surface, or on a relatively rough terrain as can be encountered on a grassy hillside.

As an alternative embodiment, the forward skid members 22 and rear skid members 28 can be formed of one piece, positioned on either side of the wheel. This has been found to add weight without added benefits to the performance of the vehicle. As another embodiment, individual lateral skids can be provided to prevent the lateral portions of the platform from contacting the terrain, with single forward and rear skids to provide the stability and braking. In such an embodiment, the performance is not as good since braking is diminished. In similar fashion, the forward spaced skids can be extended toward the rear an additional distance, and only one centrally disposed rear skid provided. The leading edges of skids which could abut and snag the terrain to be traversed are provided with a gradually upwardly sloping configuration to provide a smooth skidding surface with the terrain. The platform 12 need not be circular in configuration, but can be oblong if desired. Preferably, the corners thereof are rounded. The single wheel embodiment as shown can be replaced by a double wheel, but this adds costs. The rearward skids 28 need not terminate in upwardly curving sections 32, but the curving sections 32 improve the braking performance.

The axle 20 of the wheel 18 can be raised or lowered with respect to the platform 12 by suitable blocks affixed to the platform. If the axle is raised with respect to the platform, the center of gravity of the platform is lowered and the performance of the vehicle on smooth terrain, such as a paved surface, is excellent. If the axle is lowered, the performance of the vehicle on very rough terrain can be improved, since more clearance is provided for the platform.

I claim:

1. A recreational vehicle adapted to be ridden by a person down sloping terrain, said vehicle comprising:
    (a) a riding platform having a periphery, and an aperture provided in said platform and elongated in the direction of movement intended for said vehicle;
    (b) wheel means having an axle portion, said wheel means mounted in the aperture in said platform with said axle portion affixed to said platform and disposed perpendicular to the direction of movement intended for said vehicle, the diameter of said wheel means being sufficient that an appreciable portion thereof projects beneath said platform and an appreciable portion thereof projects above said platform;
    (c) elongated, spaced forward skid means affixed to and projecting beneath said platform with the length dimensions thereof disposed in the direction of movement intended for said vehicle, said forward skid means positioned laterally on opposite sides of a vertical plane through said wheel means and perpendicular to said wheel means axle portion, the leading edge portions of said forward skid means having a gradually upwardly sloping configuration to provide a smooth skidding surface with the terrain to be traversed and extending a sufficient distance forwardly to prevent the leading edge portions of said platform from contacting the terrain to be traversed, and the distance said wheel means projects beneath said platform being greater than the distance said forward skid means project beneath said platform;

(d) elongated, spaced rearward skid means affixed to and projecting beneath said platform with the length dimensions thereof disposed in the direction of movement intended for said vehicle, said rearward skid means positioned laterally on opposite sides of a vertical plane through said wheel means and perpendicular to said wheel means axle portion, the trailing edges of said rearward skid means extending a sufficient distance rearwardly to prevent the trailing edge portions of said platform from contacting the terrain to be traversed, the distance said wheel means projects beneath said platform being greater than the distance said rearward skid means project beneath said platform, when said vehicle is appreciably tilted with respect to the terrain upon which it is supported, at least one of said forward skid means and said rearward skid means contacting the terrain before any peripheral portion of said platform, and when said vehicle is moving in its intended direction and is tipped backwardly, said rearward skid means contacts the terrain to provide a braking action therefor; and (e) support means affixed to said platform to provide a rider on said vehicle with manual support to enable the rider to maintain a standing position on said vehicle, whereby vehicle speed on a sloping terrain can be controlled by the rider varying position on said vehicle to control the vehicle angle relative to the terrain, with braking accomplished by the rider shifting weight backward to cause said rearward skid means to contact the terrain in a skidding fashion and effect vehicle braking.

2. The vehicle as specified in claim 1, wherein said platform has a circular configuration, said wheel means is centrally disposed therein, and said wheel means has a pneumatic tire.

3. The vehicle as specified in claim 1, wherein a protective cover is affixed to said platform and covers over the portion of said wheel means which projects above said platform.

4. The vehicle as specified in claim 1, wherein said support means is a handle hinged proximate the leading edge portions of said platform.

5. The vehicle as specified in claim 1, wherein said support means is a pair of looped ropes affixed to said platform.

6. The vehicle as specified in claim 1, wherein said aperture in said platform is slightly larger than and generally conforms to the configuration of said wheel means.

7. The vehicle as specified in claim 1, wherein the trailing edges of said rearward skid means have a gradually upwardly sloping configuration to provide a smooth skidding surface with the terrain to be traversed.

8. The vehicle as specified in claim 7, wherein said forward skid means and said rearward skid means are aligned.

9. A recreational vehicle adapted to be ridden by a person down sloping terrain, said vehicle comprising:

(a) a riding platform having a periphery, and an aperture provided in said platform and elongated in the direction of movment intended for said vehicle;

(b) wheel means having an axle portion, said wheel means mounted in the aperture in said platform with said axle portion affixed to said platform and disposed perpendicular to the direction of movement intended for said vehicle, the diameter of said wheel means being sufficient that an appreciable portion thereof projects beneath said platform, and an appreciable portion thereof projects above said platform;

(c) elongated, forward and lateral skid means and elongated, rearward and lateral skid means affixed to and projecting beneath said platform with the length dimensions thereof disposed in the direction of movement intended for said vehicle; the distance said wheel means projects beneath said platform being greater than the distance said skid means project beneath said platform; said skid means respectively disposed a sufficient distance forwardly and laterally and rearwardly of said wheel means that when said vehicle is tilted appreciably with respect to the terrain on which it is supported, at least one of said skid means contacts the terrain before any portion of the periphery of said platform; and the leading edges of said skid means which could abut and snag the terrain to be traversed having a gradually upwardly sloping configuration to provide a smooth skidding surface with the terrain to be traversed; and (d) support means affixed to said platform to provide a rider on said vehicle with manual support to enable the rider to maintain a standing position on said vehicle, whereby vehicle speed on a sloping terrain can be controlled by the rider varying position on said vehicle to control the vehicle angle relative to the terrain, with braking accomplished by the rider shifting weight backward to cause said rearward skid means to contact the terrain in a skidding fashion and effect vehicle braking.

* * * * *